United States Patent [19]

Ashida

[11] Patent Number: 4,531,223
[45] Date of Patent: Jul. 23, 1985

[54] CLOCK DERIVATION CIRCUITS

[75] Inventor: Akira Ashida, Yokohama, Japan
[73] Assignee: Hitachi, Ltd., Tokyo, Japan
[21] Appl. No.: 131,446
[22] Filed: Mar. 18, 1980
[30] Foreign Application Priority Data
 Mar. 20, 1979 [JP] Japan .................................. 54-31801
[51] Int. Cl.³ ......................... H04L 7/00; H03K 5/156
[52] U.S. Cl. ...................................... 375/110; 328/63;
 328/72; 328/109; 328/110; 307/517; 307/518;
 375/95; 375/87; 375/120
[58] Field of Search ................... 328/63, 72, 109, 110;
 307/517, 518; 375/110, 95, 87

[56] References Cited

U.S. PATENT DOCUMENTS 3,624,528 11/1971 Adlhock .............................. 328/109
3,767,860 10/1973 Brown ................................. 328/109
4,029,905 6/1977 Abraham ............................. 375/110

Primary Examiner—Stanley D. Miller
Assistant Examiner—Richard Roseen
Attorney, Agent, or Firm—Antonelli, Terry & Wands

[57] ABSTRACT

This invention relates to a clock deriving system as described below. At a base radio station, data is converted to a Manchester code and modulated into an FM, PM or AM radio wave. This radio wave is received by the antenna of a radio receiving apparatus and amplified and demodulated by a radio receiver of the apparatus into the base band signal of the Manchester code form. This signal is amplified and sliced by a limiter amplifier and then supplied to a clock derivation circuit where a useful clock component is derived. This clock component is passed through a filter of a necessary clock frequency band, from which clock information is produced. This clock information is applied to a phase detector where the output clock signal from a digital PLL and the input clock information are compared in phase, that is, detection is made of whether the former is ahead of or behind the latter. If the former signal is ahead of the latter, the phase detector produces "1", whereas if the former is behind the latter, the detector produces "0". As a result, the digital PLL adjusts the phase of the incorporated clock oscillator therein, thereby deriving the clock signal of the input data.

6 Claims, 9 Drawing Figures

CLOCK DERIVATION CIRCUITS

BACKGROUND OF THE INVENTION

1. Field of the Invention

The present invention relates to clock derivation systems for telephones in a large-scale land mobile radio-telephone system utilizing the public telephone transmission circuit network as one of the main media, and particularly to a clock derivation system for deriving clock information from a Manchester code or the like having a base band of twice the clock frequency.

2. Description of the Prior Art

For deriving clock information from an input signal of base band in a digital transmission, there have been proposed two types of systems; use of a full-wave rectified signal (analog operation) and use of waveform change points (differentiated waveform) (digital operation). However, these methods have a drawback. When a Manchester code of twice the information speed, binary AMI (Alternate Mark Inversion) code or split phase code is used for a base band signal, there is a possibility that in the above two methods, phase inverted clock information is detected as correct clock information. This is caused by a fact that in the method using a fullwave rectified signal, positive and negative waves are asymmetrically rectified and in the method using waveform change points, unnecessary waves are passed due to the characteristics of the following stage of the clock wave filter and amplifier.

SUMMARY OF THE INVENTION

An object of the present invention is to always derive correct clock information from the Manchester code or the like having twice the clock speed as a base band signal.

In accordance with this invention, to achieve this object, a signal change signal is derived by detecting the rise and fall of a received base band signal, and detection is made of the case when the next signal change signal is not derived after lapse of ½·(data time slot) since a certain signal change signal was derived, thereby to derive the necessary clock information. Where, the data time slot refers to the period of the information speed.

Moreover, in accordance with the present invention, trigger output signals as signal change signals, the pulse width of which is in the range from ½·(data time slot) to 1 data time slot, is produced from a monostable oscillator in accordance with the rise and fall of a base band signal and the trigger output signals are logically summed to produce an output as a clock information.

DESCRIPTION OF THE PREFERRED EMBODIMENTS

Figure 1:
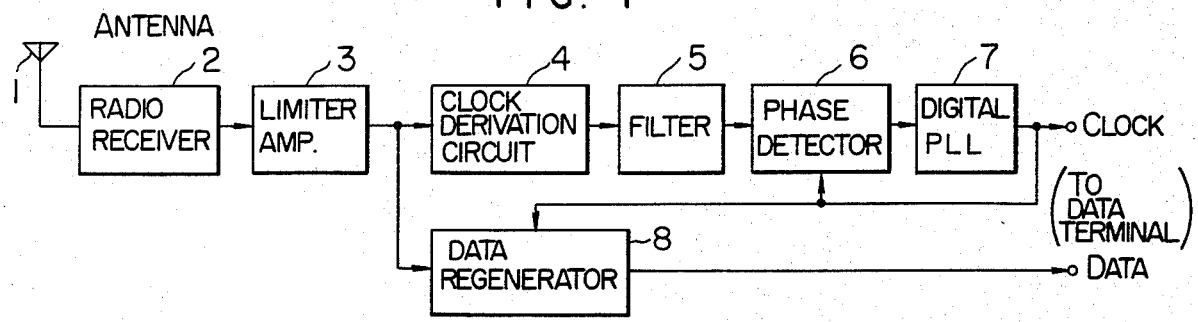
FIG. 1 is a block diagram of a mobile radio receiving apparatus in which the invention is used.

FIG. 1 is a block diagram of a mobile radio receiving apparatus including a clock derivation circuit according to the present invention. At a base radio station (not shown), data is converted to a Manchester code form and digitally modulated on a carrier into an FM, PM or AM radio wave. This radio wave is received by an antenna 1 of the mobile radio receiving apparatus and amplified and demodulated by a radio receiver 2 into a base band signal of the Manchester code form. This base-band signal is amplified and sliced by a limiter amplifier 3 then applied to a clock derivation circuit 4 where a useful clock component is derived therefrom. This useful clock component is applied to a filter 5, from which a desired clock frequency band is produced. This clock frequency band is then applied as input clock information to a phase detector 6 where it is compared in phase with a clock signal derived from the output of a digital PLL circuit 7, that is, the phase detector 6 detects whether the former signal is behind or ahead of the latter signal. If the former signal, or the input clock information is ahead of the latter signal, or the output clock signal from the digital PLL circuit 7, the phase detector 6 produces "1" output, whereas if the former signal is behind the latter, the phase detector 6 produces "0" output. As a result, the digital PLL circuit 7 performs the phase adjustment for the incorporated clock oscillator therein and thus produces the clock signal of the input data. Reference numeral 8 denotes a data generator which derives data by using the outputs of the limiter amplifier 3 and the digital PLL circuit 7.

The present invention relates to a clock derivation circuit for such use. The present invention will hereinafter be described in detail with reference to FIGS. 2 to 9.

Figure 2:
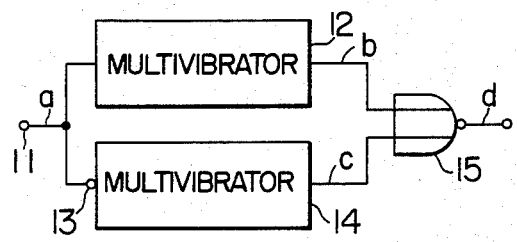
FIG. 2 is a block diagram of a clock deriving circuit of the invention.
Figure 3:
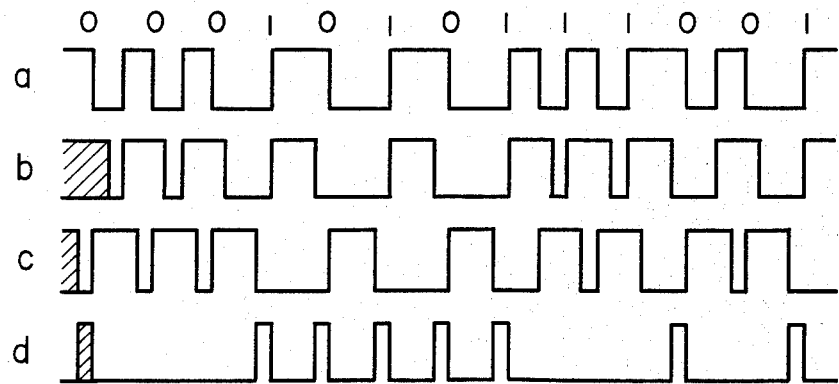
FIG. 3 is a waveform diagram at main parts of FIG. 2.

FIGS. 2 and 3 are a circuit block diagram of one embodiment of the present invention, and input output waveforms at a main part of the circuit. If a Manchester code signal a shown in FIG. 3 is applied through an input terminal 11 to a monostable oscillator (a monostable multivibrator or one-shot circuit) 12 and a monostable oscillator 14 with an inverter 13, the monostable oscillators 12 and 14 are triggered by the leading edges of the input signal. Thus, the monostable oscillators 12 and 14 are respectively triggered at the leading and trailing edges of the Manchester code signal a to produce trigger outputs signals b and c as shown in FIG. 3. In this case, the pulse duration of each of the output signals b and c of the monostable oscillators 12 and 14 is selected to be ½·(data time slot) or above and less than the data time slot inclusive (in this embodiment, ¾·(data time slot)). The trigger output signals b and c are applied to a NOR gate 15 as a logically summing device, which then produces an output signal d as shown in FIG. 3. This output signal d is the clock information with correct phase information as a result of accurately removing the double clock component from the Manchester code signal a.

Figure 4:
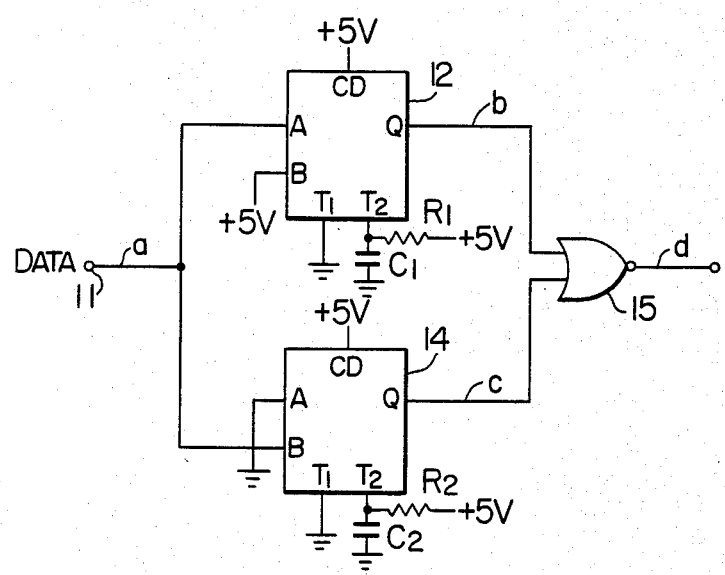
FIG. 4 is a more specific circuit diagram of the clock deriving circuit of the invention shown in FIG. 2.

FIG. 4 shows a specific construction of the monostable multivibrators 12 and 14, for example, MC 14538 (made by Motorola Co.). When the Manchester code signal a is similarly applied through the input terminal 11 to an input end A of the monostable multivibrator 12, the monostable multivibrator 12 is triggered by the leading edge of the input code to produce the pulse signal b the duration of which is determined to be ½·(digital slot) or above and less than one data slot inclusive by the time constant of a capacitor $C_1$ and resistor $R_1$ connected to a terminal $T_2$. When the Manchester code signal a is applied to an input end B of the other monostable multivibrator 14, the monostable multivibrator 14 is triggered by the trailing edge of the code to produce the pulse signal c the duration of which is similarly determined to be ½·(digital slot) or above and less than one data time slot inclusive by the time constant of a capacitor $C_2$ and resistor $R_2$ connected to a terminal $T_2$ of the monostable multivibrator 14. The two pulse output signals b and c are applied to the NOR gate 15, which then produces the output signal d. Thus, the output signal d is the clock component derived from a train of data which, as shown in FIG. 3, changes from "0" to "1" and "1" to "0". In this case, it will be seen that the double clock component is removed from the input data of the Manchester code waveform.

Figure 5:
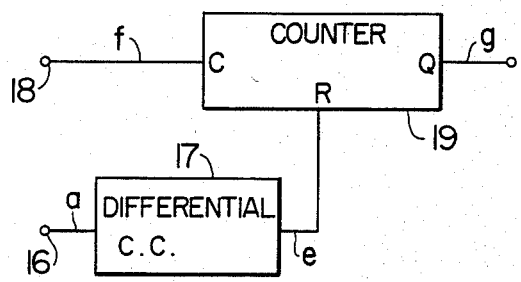
FIG. 5 is a block diagram of another embodiment of the clock deriving circuit of the invention.
Figure 6:
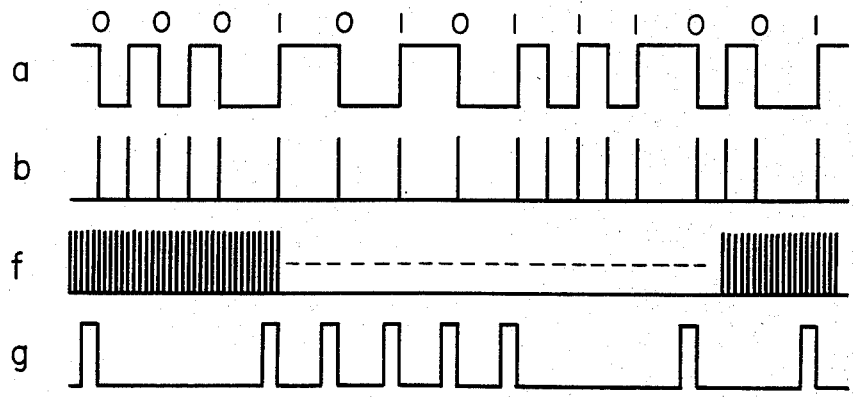
FIG. 6 is a waveform diagram at main parts of FIG. 5.

The circuit arrangement of FIG. 4, however, requires a large-value capacitor because of inclusion of monostable multivibrators 12 and 14, and thus is not suited to be formed as an integrated circuit. FIG. 5 is a circuit arrangement of another embodiment of the present invention which employs a counter in place of the capacitor to make an integrated circuit version easy. FIG. 6 shows waveforms at a main part thereof. If the Manchester code signal a is applied through an input terminal 16 to a differentiation circuit 17 as illustrated, a differentiated output signal e is produced therefrom at the leading and trailing edges of the input code. This output signal e is used as a reset signal to a counter 19 which serves to count a clock signal f of a high frequency (several times the data speed or above) which is applied through an input terminal 18 to the counter 19. If N (the period of the high frequency clock signal f) is selected to be smaller than 1 data time slot and larger than or equal to ½·(data time slot) where N is the maximum count value of the counter 19, the counter 19 is reset by each application of the differentiated output signal e and repeat the count operation. If one differentiated output has been supplied, but when ½·(data time slot) later the next differentiated output is not applied as yet, the counter 19 produces the maximum count output signal g just when it has counted N clock signals f. As a consequence, the maximum count output signal g has the same effect as the output signal d shown in FIG. 2.

As will be understood from FIGS. 5 and 6, the output signal d or g as a clock signal is derived when the data pulse is changed from "0" to "1" or from "1" to "0", which fact is evident because the change points of the data waveform correspond to the clock information.

Figure 7:
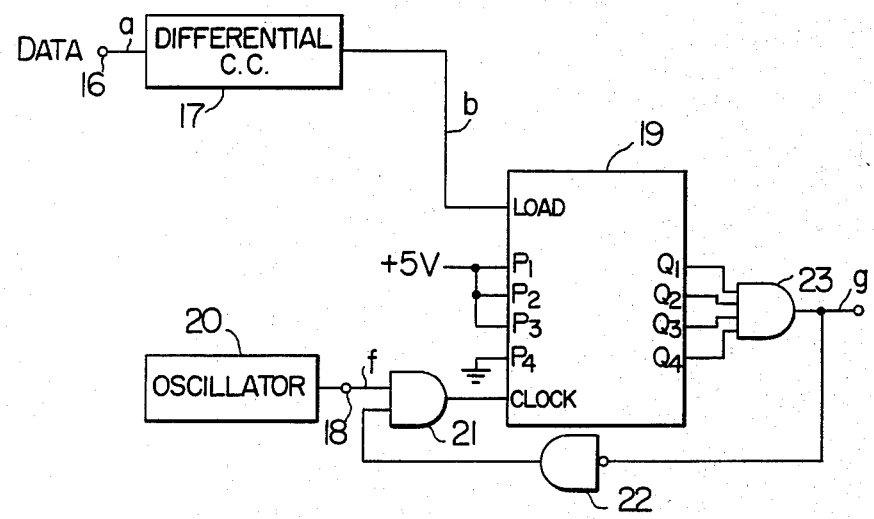
FIG. 7 is a more specific circuit diagram of the clock deriving circuit shown in FIG. 5.

FIG. 7 is a more specific arrangement of the circuit diagram of FIG. 5, and it includes an oscillator 20, an AND gate 21, an inverter 22 and an AND gate 23 in addition to the circuit components in FIG. 5. Therefore, this specific arrangement of FIG. 7 can all be formed of digital circuits for an integrated circuit version as compared with the circuit construction of FIG. 5.

The differentiation circuit 17 as described above serves to convert the Manchester code signal a supplied through the input terminal 16, to the pulse signal b of short duration at the change points, or leading edges of the input pulse. The oscillator 20 is formed of a pulse generator which generates a pulse of a frequency (for example, 10 times the clock frequency) higher than the clock frequency. The counter 19 is a binary counter of, for example, the HD74LS161 made by Hitachi Ltd. or the MC1416B made by Motorola Co. This counter 19 is constructed to be preset at $p_1 = p_2 = p_3 = 1$, $p_4 = 0$ i.e., in binary notation, 1110 (7 in decimal notation) and to take the initial set value of 1110 when supplied at its load terminal with the trigger pulse signal b as shown in FIG. 6, then to count the input clock supplied at its clock terminal. The outputs from four output terminals Q1 to Q4 of the counter 19 are applied to the AND gate 23, which produces a "1" output only when all the inputs are "1" (at 15 in decimal notation), that is, when the counter has counted 8 (15−7). Thus, counting is started from the initial value at which the counter is preset by the trigger pulse signal b supplied to the load terminal. If the next trigger pulse signal b comes after a lapse of ½×(1 time slot) of data, the count value is again preset before the AND gate 23 produces an output of "1" and then counting is repeated from the beginning. If the next trigger pulse signal comes after lapse of 1 time slot, all the outputs from the four output terminals Q1 to Q4 of the counter 19 become "1" before the next trigger pulse signal comes, that is, after lapse of 80%×(1 time slot). At this time, the signal "0" from the inverter 22 is applied to the AND gate 21 together with the high speed clock signal f from the oscillator 20 shown in FIG. 7. Thus, the high speed clock signal is prevented from being supplied to the clock terminal of the counter 19 until the next trigger pulse signal comes, so that the outputs from the terminals Q1 to Q4 of the counter 19 are all kept at "1". The clock signal thus derived is shown in FIG. 6 at signal g.

Figure 8:
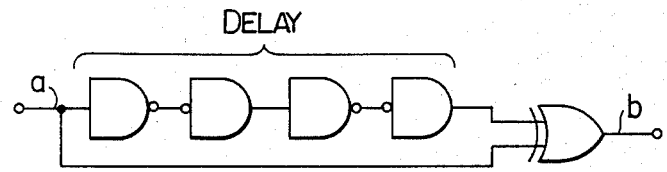
FIG. 8 is a more specific circuit arrangement of a differentiation circuit in FIG. 7.
Figure 9:
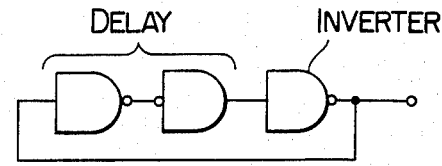
FIG. 9 is a more specific circuit arrangement of an oscillator in FIG. 7.

FIG. 8 is a specific example of the differentiation circuit 17 in FIG. 7, and FIG. 9 is a specific example of the oscillator 20 in FIG. 7.

In accordance with the present invention as described above, a signal change signal indicative of the change of signal level is derived by detecting the rising and falling of the base band signal received, and when the next signal change signal is not derived by the time of ½·(data time slot) after the time point at which a certain signal change signal is derived, the clock information is derived by detecting this fact. Therefore, unnecessary clock components included in, for example, the Manchester code as input data, that is, the unnecessary clock components based on the continuous data of logic "0" or "1" can be surely removed, and thus the clock including only useful clock information can be derived.

What is claimed is:

1. A clock signal deriving method for deriving clock information from an input data signal encoded by a Manchester code or the like having a base band of twice the clock frequency, comprising the steps of:
   producing data signal change signals indicative of data value changes in the input signal from one binary value to the other by
   (a) detecting the rise and fall of the base band input data signal; and
   (b) detecting that no rise or fall in the input data signal has occurred for a time ranging from ½ of a data time slot to one data time slot after a respective rise or fall has been detected.

2. A clock signal deriving method according to claim 1, wherein said data signal change signals are produced by logically summing the outputs of a pair of monostable multivibrators whose outputs identify the rise and fall of the base band signal, respectively, and the pulse width of which is in the range from ½ of a data time slot to 1 data time slot.

3. A clock signal deriving method according to claim 1, wherein said data signal change signals are obtained by differentiating the base band signal at its rising and falling edges to produce pulse signals, and applying said pulse signals as a reset signal to a counter to which is applied a high-frequency clock several times higher in frequency than the input data signal, the counter producing said data signal change signals to indicate that it has counted said high-frequency clock during a time period from ½ of a data time slot to 1 data time slot after a certain reset signal was applied to the counter, thereby deriving the clock information.

4. A clock deriving circuit comprising:
a differentiation circuit for producing a pulse of narrow width at the change points of a Manchester code;
a pulse generator for producing a pulse train at a frequency much higher than a clock frequency; and
a counter which is supplied at its clock and reset terminals with the outputs from said pulse generator and said differentiation circuit, respectively, to produce a clock signal at its output terminal.

5. A clock deriving circuit comprising:
a differentiation circuit for producing a pulse of narrow width at the change points of a Manchester code;
a pulse generator for generating a pulse of a frequency much higher than a clock frequency; and
a binary counter which is supplied at its load terminal with the output from said differentiation circuit, and supplied at its clock terminal with a logical product of the output of said pulse generator and an output from an inverter to which is applied the output of an AND gate for taking the logical product of the outputs at the output terminals of the counter.

6. A clock signal deriving system for deriving clock information from an input data signal encoded by a Manchester code or the like having a base band of twice the clock frequency, comprising:
means for producing data signal change signals indicative of data value changes in the input data signal from one binary value to the other, including
(a) means for detecting the rise and fall of the base band input data signal; and
(b) means for detecting that no rise or fall in the input data signal has occurred for a time ranging from ½ of a data time slot to one data time slot after a respective rise or fall has been detected.

* * * * *